US008862087B2

(12) United States Patent
Mikhemar et al.

(10) Patent No.: US 8,862,087 B2
(45) Date of Patent: Oct. 14, 2014

(54) RECIPROCAL MIXING NOISE CANCELLATION IN THE PRESENCE OF A MODULATED BLOCKER

(71) Applicant: Broadcom Corporation, Irvine, CA (US)

(72) Inventors: Mohyee Mikhemar, Aliso Viejo, CA (US); David Murphy, Costa Mesa, CA (US); Hooman Darabi, Laguna Niguel, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/897,306

(22) Filed: May 17, 2013

(65) Prior Publication Data

US 2014/0235191 A1    Aug. 21, 2014

Related U.S. Application Data

(60) Provisional application No. 61/766,627, filed on Feb. 19, 2013.

(51) Int. Cl.
*H04B 1/10* (2006.01)
(52) U.S. Cl.
CPC ........................................ *H04B 1/10* (2013.01)
USPC ........ 455/295; 455/130; 455/209; 455/245.1; 455/296

(58) Field of Classification Search
CPC ..... H04B 1/10; H04B 1/1027; H04B 2001/10
USPC ......... 455/1, 63.1, 130, 136, 138, 209, 232.1, 455/234.1, 245.1, 296, 295
See application file for complete search history.

(56) References Cited

U.S. PATENT DOCUMENTS

| 5,950,119 | A | * | 9/1999 | McGeehan et al. | ............ 455/302 |
| 2006/0109939 | A1 | * | 5/2006 | Ciccarelli et al. | ............. 375/350 |
| 2011/0280344 | A1 | * | 11/2011 | Ye et al. | ........................ 375/327 |

* cited by examiner

*Primary Examiner* — Tuan Pham
(74) *Attorney, Agent, or Firm* — McDermott Will & Emery LLP

(57) ABSTRACT

A method for reciprocal-mixing noise cancellation may include receiving, from a first mixer, a first signal comprising a wanted signal at a first frequency and a modulated signal at a second frequency. The modulated signal may be a product of a reciprocal-mixing of an unwanted signal with a phase noise. One or more portions of the modulated signal may overlap the wanted signal, adding a reciprocal-mixing noise to the wanted signal. A second signal may be generated by mixing, at a second mixer, the first signal with a third signal, which is at a third frequency related to a blocker offset frequency. A gain may be applied to the second signal to generate an amplified second signal that may be subtracted from the first signal to generate a fourth signal. The fourth signal may be filtered to generate the wanted signal at the first frequency without the reciprocal-mixing noise.

20 Claims, 7 Drawing Sheets

RECIPROCAL MIXING NOISE CANCELLATION IN THE PRESENCE OF A MODULATED BLOCKER

TECHNICAL FIELD

The present description relates generally to radio frequency (RF) communications, and more particularly, but not exclusively, to reciprocal mixing noise cancellation in the presence of a modulated blocker.

CROSS-REFERENCES TO RELATED APPLICATIONS

The present application claims the benefit of priority from U.S. Provisional Patent Application Ser. No. 61/766,627, filed on Feb. 19, 2013, which is hereby incorporated by reference in its entirety for all purposes.

BACKGROUND

The airwaves may be crowded with wireless signals, e.g., cellular signals, Wi-Fi signals, and/or other wireless signals. Accordingly, radio receivers may need to tolerate large blocker signals, e.g., unwanted signals that may interfere with a wanted signal. In addition, during down-conversion in a receiver, reciprocal mixing of the phase noise of a local oscillator (LO) with an unwanted blocker signal may deposit additive noise on top of the wanted signal. The undesirable effects of reciprocal mixing can be mitigated, in some instances, by filtering the unwanted blocker signal prior to down-conversion using strong radio frequency (RF) filters. However, the addition of sharp RF filters may come at the expense of power, cost, and/or area. The undesirable effects of reciprocal mixing may also be mitigated by implementing oscillators that have minimal phase noise, such as LC-oscillators. However, the phase noise improvement of an LC-oscillator may also come at the expense of power, cost, and/or area.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more implementations. In one or more instances, well-known structures and components are shown in block diagram form in order to avoid obscuring the concepts of the subject technology.

Figure 1A:
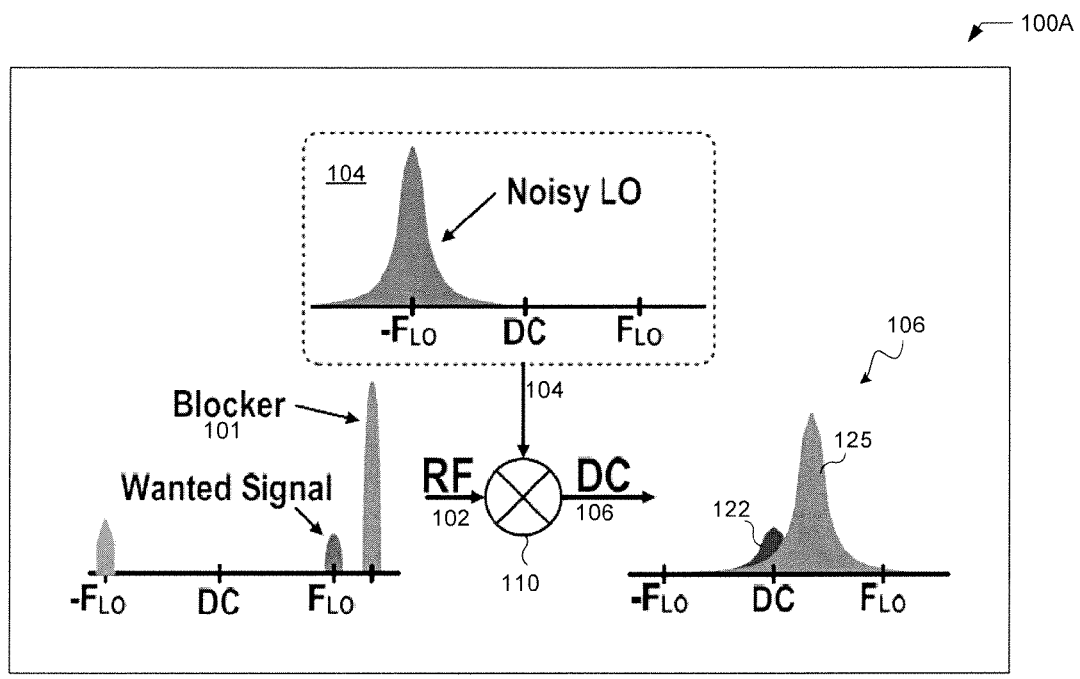
FIG. 1A illustrates an example down-conversion mixer with a noisy local oscillator (LO) causing generation of reciprocal mixing noise.

FIG. 1A illustrates an example down-conversion mixer 110 with a noisy local oscillator (LO) 104 causing generation of a reciprocal mixing noise. The down-conversion mixer 110 may receive a radio frequency (RF) signal 102 and mix the RF signal 102 with the LO signal 104 to generate a baseband signal 106. The RF signal 102 may include a wanted signal 122 (e.g., desired signal) at an operating frequency of the LO (e.g., LO frequency, $F_{LO}$), a corresponding image signal at a negative frequency, $-F_{LO}$, and a narrow band blocker 101 (e.g., an unwanted signal) at an offset from the $F_{LO}$. The LO signal 104 may be a noisy LO signal with a symmetrical phase noise frequency spectrum centered at $F_{LO}$ (and also with an image spectrum at $-F_{LO}$, as shown in FIG. 1A). The down-conversion mixer 110 may down convert the RF signal 102 to generate the baseband signal 106 at near-zero frequencies (e.g., DC).

Ideally, if the LO signal 104 was noiseless, one would expect the baseband signal 106 to be a replica of the RF signal 102 (i.e., the positive frequency portion of the signal) shifted down in frequency, by an amount equal to $F_{LO}$, to DC. In practice, however, the other frequencies of the phase noise frequency spectrum of the noisy LO signal 104 may also mix with the narrow blocker 101 to generate a wideband modulated signal (hereinafter "modulated signal") 125 with a symmetrical reciprocal-mixing profile. The problem with this undesirable mixing is that a tail of the modulated signal 125 can superimpose the wanted signal 122 (at around DC) to deposit additional noise on the wanted signal 122. The subject technology makes use of an auxiliary path to mitigate the reciprocal mixing noise in the presence of a modulated blocker, as further explained herein.

Figure 1B:
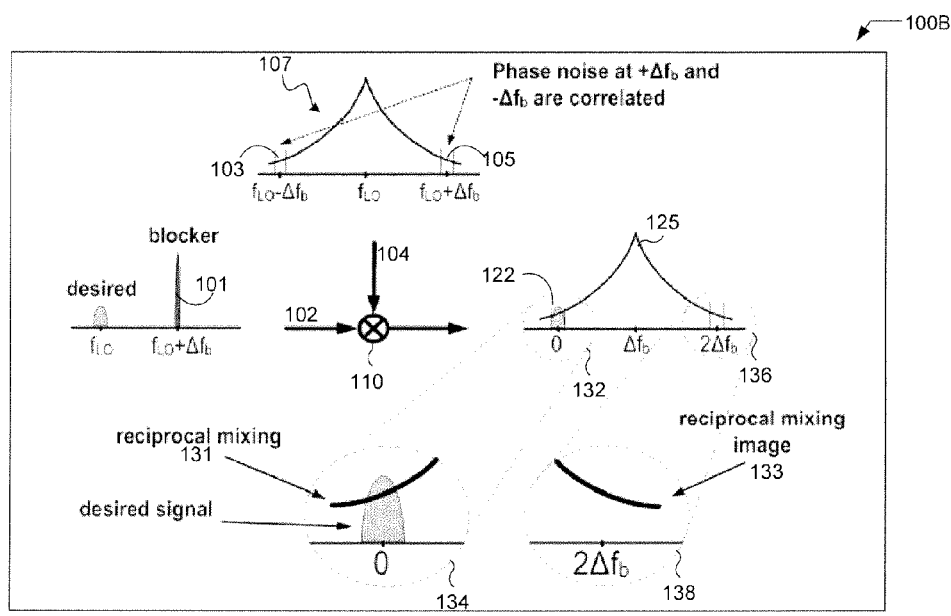
FIG. 1B illustrates an example symmetrical reciprocal mixing profile showing reciprocal mixing noise and its image.

FIG. 1B illustrates an example symmetrical reciprocal mixing profile showing reciprocal mixing noise and a corresponding image. A frequency spectrum 107 of the phase noise of the LO signal 104 is a symmetrical frequency spectrum centered at LO frequency ($f_{LO}$). Consequently, the phase noise at any positive offset from the LO frequency is an image of the phase noise at the same negative offset. For example, the phase noise 105 at an offset $\Delta f_b$ from the LO frequency is an image of the phase noise 103 at an offset $-\Delta f_b$ from the LO frequency.

When the phase noise with the symmetrical frequency spectrum 105 is mixed with a narrow blocker 101, a modulated signal 125 with a symmetrical reciprocal mixing profile centered at $\Delta f_b$ (e.g., the blocker beat frequency) may be generated. The tail of the modulated signal 125 around DC (e.g., portion 131) may be in the same frequency band (e.g., in-band) as the wanted signal 122 and thus indistinguishable from the wanted signal 122 (e.g., desired signal). The portions 132 and 136 of the modulated signal 125 are blown-up and shown as portions 134 and 138, respectively, for more clear illustration of the in-band reciprocal mixing 131 and the corresponding image 133 of the in-band reciprocal mixing 131.

The case of a narrow band blocker was described here for demonstration of the reciprocal mixing process. The subject disclosure, however, is directed to reciprocal mixing noise cancellation in the presence of a modulated (e.g., an arbitrarily modulated, such as amplitude modulated (AM), phase modulated (PM), or frequency modulated (FM)) blockers. Therefore, a mathematical treatment of the disclosed technique for reciprocal noise cancellation in the presence of the modulated blocker is described herein.

Figure 2A:
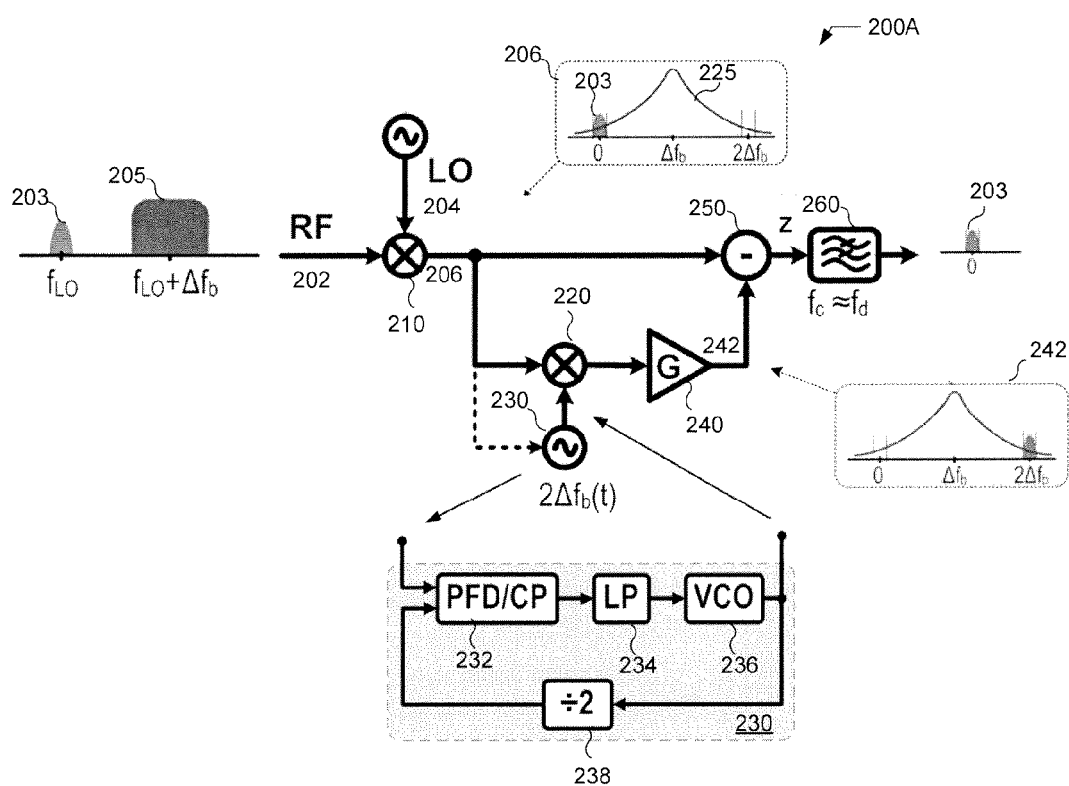
FIG. 2A illustrates an example system for reciprocal mixing noise cancellation in the presence of a modulated blocker signal in accordance with one or more implementations.

FIG. 2A illustrates an example system 200A for reciprocal mixing noise cancellation in the presence of a modulated blocker 205 in accordance with one or more implementations of the subject technology. The system 200A includes a main path and an auxiliary path. The main path may include a first mixer 210, a subtraction circuit 250, and a filter 260. The auxiliary path may include a second mixer 220, a signal generator 230, and a gain stage 240. An RF signal 202 is down-converted in a main path by the first mixer 210 by mixing it with a LO signal 204 to generate a first signal 206, which is a baseband signal. The RF signal 202 may include a wanted signal 203 (e.g., desired signal) at LO frequency $F_{LO}$ and a modulated blocker signal 205 at an offset frequency $\Delta f_b$, which corresponds to the blocker frequency. The LO signal 204 may be a noisy Lo with a phase-noise frequency spectrum centered at the LO frequency $F_{LO}$. The baseband signal 206 (hereinafter "signal 206") may include the wanted signal 203 down-converted to a first frequency (e.g., DC) and a modulated signal 225 at a second frequency (e.g., down-converted to the blocker offset frequency $\Delta f_b$). The modulated signal 225 is the product of mixing of the blocker signal with frequencies of the phase noise of the LO, and thus has a symmetrical frequency spectrum centered at $\Delta f_b$.

As discussed above with respect to FIG. 1B, the tail of the modulated signal 225 may be in-band (e.g., 131 of FIG. 1B) with respect to the wanted signal 203, and thus may be indistinguishable from the wanted signal 203. The system 200A may provide for generating a mirror image (e.g., signal 242) of the frequency spectrum of the signal 206 and subtraction of the mirror image from the signal 206 to produce the wanted signal 203, free from the reciprocal mixing noise.

In the auxiliary path, the mirror image may be produced by multiplying the signal 206 by a third signal at double the frequency of the blocker offset frequency (e.g., $2\Delta f_b$). The third signal may be generated by the signal generator 230. The signal generator 230 may include a wideband phase-locked loop (PLL) that is used as an FM detector, a frequency multiplier by two, and a frequency modulator to generate the third signal, which is the auxiliary-path LO with frequency modulation information. The output of the auxiliary path (e.g., signal 242) is then a replica of the in-band reciprocal mixing. So after subtraction in the subtraction circuit 250 and filtration by the pass-band filter (PBF) 260, the desired signal 203 is recovered free of the in-band reciprocal mixing. The wideband PLL may be a low frequency and low power design with an output frequency, for example, in the order of tens of MHz set by the blocker offset. In one or more aspects, the Wideband PLL may include a phase frequency detector (PFD)/charge pump (CP) block 232, a low pass (LP) filter 234, a voltage-controlled oscillator (VCO) 236, and a divide-by-2 block 238, which are known, and are not described herein for brevity.

Figure 2B:
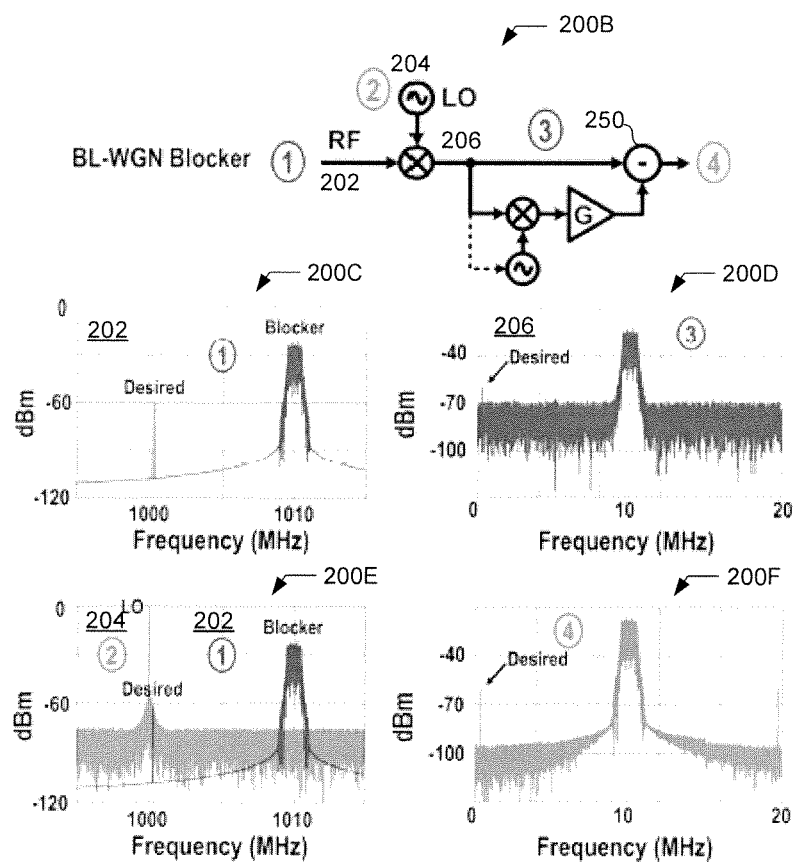
FIG. 2B illustrates examples of frequency spectra of various signals of the system of FIG. 2A in accordance with one or more implementations.

FIG. 2B illustrates examples of frequency spectra of various signals of the system 200A of FIG. 2A in accordance with one or more implementations of the subject technology. The frequency spectra shown in 200C-200F are the simulation results of the system 200B, when a band-limited white Gaussian noise (BL-WGN) blocker (e.g., at 1010 MHz) and single-tone desired signal (e.g., at 1000 MHz) are used as the input RF signal 202. The system 200B is a replica of the system 200A except that the BPF 260 of FIG. 2A is not used in the system 200B. The spectrum 200C represents the input RF signal 202. The baseband signal 206 is represented by the spectrum 200D, which shows the down-converted desired signal at approximately 100 KHz and the down-converted blocker signal at 10 MHz. The spectrum 200E represent the input RF signal 202 and the LO signal 204, where the LO and the single-tone desired signal coincide in frequency. The output signal of the subtraction circuit 250 is represented with the spectrum 200F, which shows that the reciprocal mixing noise floor is substantially attenuated (e.g., approximately 25 dB).

Figure 3:
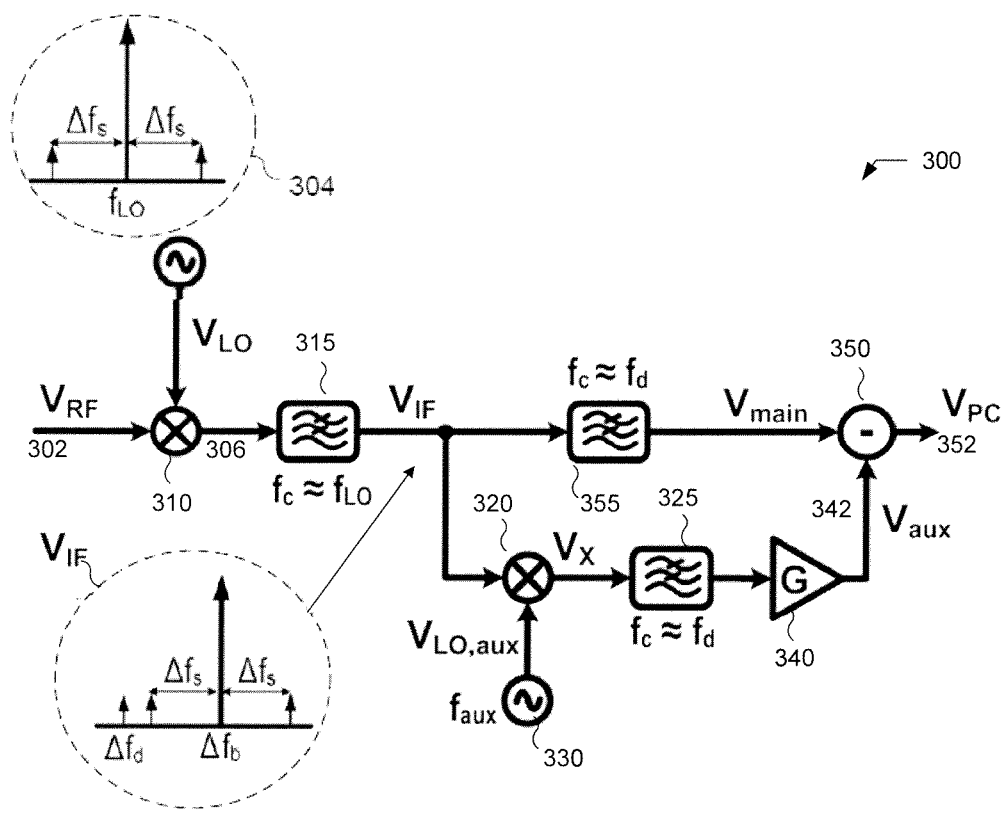
FIG. 3 illustrates an example system for reciprocal mixing noise cancellation in the presence of a modulated blocker signal in accordance with one or more implementations.

FIG. 3 illustrates an example system 300 for reciprocal mixing noise cancellation in the presence of a modulated blocker signal in accordance with one or more implementations of the subject technology. The system 300 includes a main path and an auxiliary path. The main path includes a first mixer 310, a LPF 315 with a cut-off frequency at the LO frequency $f_{LO}$, a subtraction circuit 350, and a LPF 355 having a cut-off frequency at the desired signal frequency $f_d$. The auxiliary path includes a second mixer 320 and a signal generator 330 (e.g., the wideband PLL 230 of FIG. 2A), a LPF 325 with a cut-off frequency at the desired signal frequency $f_d$, and a gain stage with an amplification of G. The LO signal 304 is shown as a tone at LO frequency $f_{LO}$ and the phase noise of the LO signal is indicated as two spur signals at $\Delta f_s$ with respect to the $f_{LO}$. The LPF 315 removes the upper sideband signal from the mixer output and leaves the lower sideband signal $V_{IF}$, which is further filtered by the LPF 355 with a cut-off frequency at the desired signal frequency $f_d$ to generate the main path signal $V_{main}$. The down-converted signal $V_{IF}$ is processed in the auxiliary path to generate a signal 342 (e.g., $V_{aux}$). The signal $V_{aux}$ is then subtracted from the main path signal $V_{main}$ to generate the output signal 35 e.g., ($V_{PC}$). More detailed mathematical treatment of the subject technology as related to signals $V_{IF}$, $V_{aux}$, and $V_{PC}$ are provided herein.

The RF signal 302, the LO signal 304, the down-converted signal 306 (e.g., $MXR_{out}$), and the signal X (e.g., the lower sideband component of the $MXR_{out}$) may be given as:

$$RF = \cos(\omega_b t + \theta_b) + \alpha \cos(\omega_d t) \quad (1)$$

where subscripts d and b indicate the desired signal and the blocker, respectively. Both the desired signal and the blocker signal may have amplitude modulation A(t) and phase modulation θ(t). This RF input is mixed with the noisy clock $$LO = \cos(\omega_{LO} t + \theta_{LO} + \phi_n) \quad (2)$$

where $\omega_{LO} = 2\pi f_{LO}$, and $f_{LO}$ is the oscillator chain output frequency, $\theta_{LO}$ is a static phase shift and $\phi_n(t)$ is the instantaneous phase noise. Equation (2) can be expanded in the form:

$$LO = \cos(\omega_{LO} t + \theta_{LO})\cos(\phi_n(t)) - \sin(\omega_{LO} t + \theta_{LO})\sin(\phi_n(t)) \quad (3)$$

And since the magnitude of phase noise is small, $\phi_n(t) \ll 1$, using this condition, which is known as the Narrow-band FM approximation, equation (3) becomes:

$$LO = \cos(\omega_{LO} t + \theta_{LO}) - \phi_n(t)\sin(\omega_{LO} t + \theta_{LO}) \quad (4)$$

Without compromising the generality of the analysis, the phase noise can be modeled as a set of infinite uncorrelated spurs with the same PSD. Then the analysis is done for one spur and a final expression is derived in terms of the spur offset frequency $\Delta\omega_s$ and an amplitude $\phi_s$. The final result may be easily extended for a phase noise with arbitrarily power spectral density. In doing so, the phase noise is modeled with a single-tone spur: $\phi_n(t)=\phi_s \cos(\Delta\omega_s t+\theta_s)$, then (4) becomes:

$$LO = \cos(\omega_{LO}t + \theta_{LO}) - \qquad (5)$$
$$\frac{\varphi_s}{2}\sin((\omega_{LO} + \Delta\omega_s)t + \theta_{LO} + \theta_s) + \frac{\varphi_s}{2}\sin((\omega_{LO} - \Delta\omega_s)t + \theta_{LO} - \theta_s)$$

The output of the mixer is the product of the RF and the LO and has a lower sideband (LSB) and an upper sideband (USB)

$$MXR_{out} = RF \cdot LO = MXR_{USB} + MXR_{LSB} \qquad (6)$$

The filtered down-converted output $V_{IF}$ is given by:

$$V_{IF} = V_{IF,d} + V_{IF,b} + V_{RM} + V_{RM,d} \qquad (7)$$

where, $$V_{IF,d} = \frac{A_d(t)}{2}\cos(\Delta\omega_d t + \theta_d(t) - \theta_{LO}) \qquad (8)$$

$$V_{IF,b} = \frac{A_b(t)}{2}\cos(\Delta\omega_b t + \theta_b(t) - \theta_{LO}) \qquad (9)$$

$$V_{RM,d} = \frac{\varphi_s A_d(t)}{4}[\sin((\Delta\omega_d - \Delta\omega_s)t + \theta_d(t) - \theta_{LO} - \theta_s) - \qquad (10)$$
$$\sin((\Delta\omega_d + \Delta\omega_s)t + \theta_d(t) - \theta_{LO} + \theta_s)]$$

$$V_{RM} = \frac{\varphi_s A_b(t)}{4}[\sin((\Delta\omega_b - \Delta\omega_s)t + \theta_b(t) - \theta_{LO} - \theta_s) - \qquad (11)$$
$$\sin((\Delta\omega_b + \Delta\omega_s)t + \theta_b(t) - \theta_{LO} + \theta_s)]$$

and the blocker and desired signal offset frequency are given by $\Delta\omega_d = \omega_d - \omega_{LO}$ and $\Delta\omega_b = \omega_b - \omega_{LO}$ respectively. The terms $V_{IF,d}$ and $V_{IF,b}$ represent the down-converted desired signal and blocker. The desired signal mixing term $V_{RM,d}$ may be much weaker than the desired signal Error! Reference source not found. and may only be important if the desired signal is much larger the receiver noise to the point that $V_{RM,d}$ becomes the new noise floor. This is typically not the case in the presence of large blockers, so $V_{RM,d}$ can be neglected. Without loss of generality, one may assume that $\omega_d > \omega_{LO}$ such that the first term in (11) is the in-band reciprocal mixing (RM) and the second term is the replica. It may also be implied that $|\Delta\omega_b - \Delta\omega_s| \approx |\Delta\omega_b|$ so that the RM is indeed in-band. Therefore, the in-band RM and the replica can be written as follows:

$$V_{RM} = V_{RM,ib} + V_{RM,replica} \qquad (12)$$

where $$V_{RM,ib} = \frac{\varphi_s A_b(t)}{4}\sin((\Delta\omega_b - \Delta\omega_s)t + \theta_b(t) - \theta_{LO} - \theta_s) \qquad (13)$$

$$V_{RM,replica} = -\frac{\varphi_s A_b(t)}{4}\sin((\Delta\omega_b + \Delta\omega_s)t + \theta_b(t) - \theta_{LO} + \theta_s)$$

The IF output $V_{IF}$ in FIG. 3 is low-pass filtered in the main path to reject the blocker and the RM replica, leaving only the desired signal and the in-band RM. Assuming all filters have a unity pass-band gain, the main path output can be written as:

$$V_{RM} = V_{RM,ib} + V_{RM,replica} \qquad (14)$$

In the auxiliary path, the IF output is multiplied by a carrier as follows:

$$V_X = V_{IF} \cdot \cos(\omega_{aux}t + \theta_{aux}(t)) = [V_{IF,d} + V_{IF,d} + V_{RM,ib} + V_{RM,replica}]\cos(\omega_{aux}t + \theta_{aux}(t)) \qquad (15)$$

The first three terms in (15) can be rejected by the LPF, the fourth term have an up-converted term, which is rejected by the LPF and a down-converted term, which is amplified by the factor G to yield the following output of the auxiliary path:

$$V_{aux} = G\frac{\varphi_s A_b(t)}{2} \qquad (16)$$
$$\sin((\Delta\omega_b + \Delta\omega_s - \omega_{aux})t + \theta_b(t) - \theta_{LO} + \theta_s - \theta_{aux}(t))]$$

To find the condition of cancellation we set $V_{aux} = V_{RM,ib}$ which yields:

$$G\sin((\Delta\omega_b + \Delta\omega_s - \omega_{aux})t + \theta_b(t) - \theta_{LO} + \theta_s - \theta_{aux}(t))] = 1/2$$
$$\sin((\Delta\omega_b - \Delta\omega_s)t + \theta_b(t) - \theta_{LO} - \theta_s) \qquad (17)$$

This equation has two solutions:
1. $G=1/2$, $\omega_{aux}=2\Delta\omega_s$ and $\theta_{aux}(t)=2\theta_s-2\theta_{LO}$
2. $G=-1/2$, $\omega_{aux}=2\Delta\omega_b$ and $\theta_{aux}(t)=2\theta_b(t)-2\theta_{LO}$ Both solutions are mathematically valid, but the first solution may require knowledge of the spur frequency which may be impractical for phase-noise. The second solution, however, may require knowledge of the blocker offset frequency and modulation which is, conveniently, a strong low-frequency signal present at the output of the mixer. So the auxiliary path carrier is given by:

$$V_{LO,aux} = (2\Delta\omega_b t + 2\theta_b(t) - 2\theta_{LO}) \qquad (18)$$

In practice, the blocker offset frequency and phase-modulation are not explicitly needed, as they are recovered using an IF PLL, presented in the next section.

Figure 4:
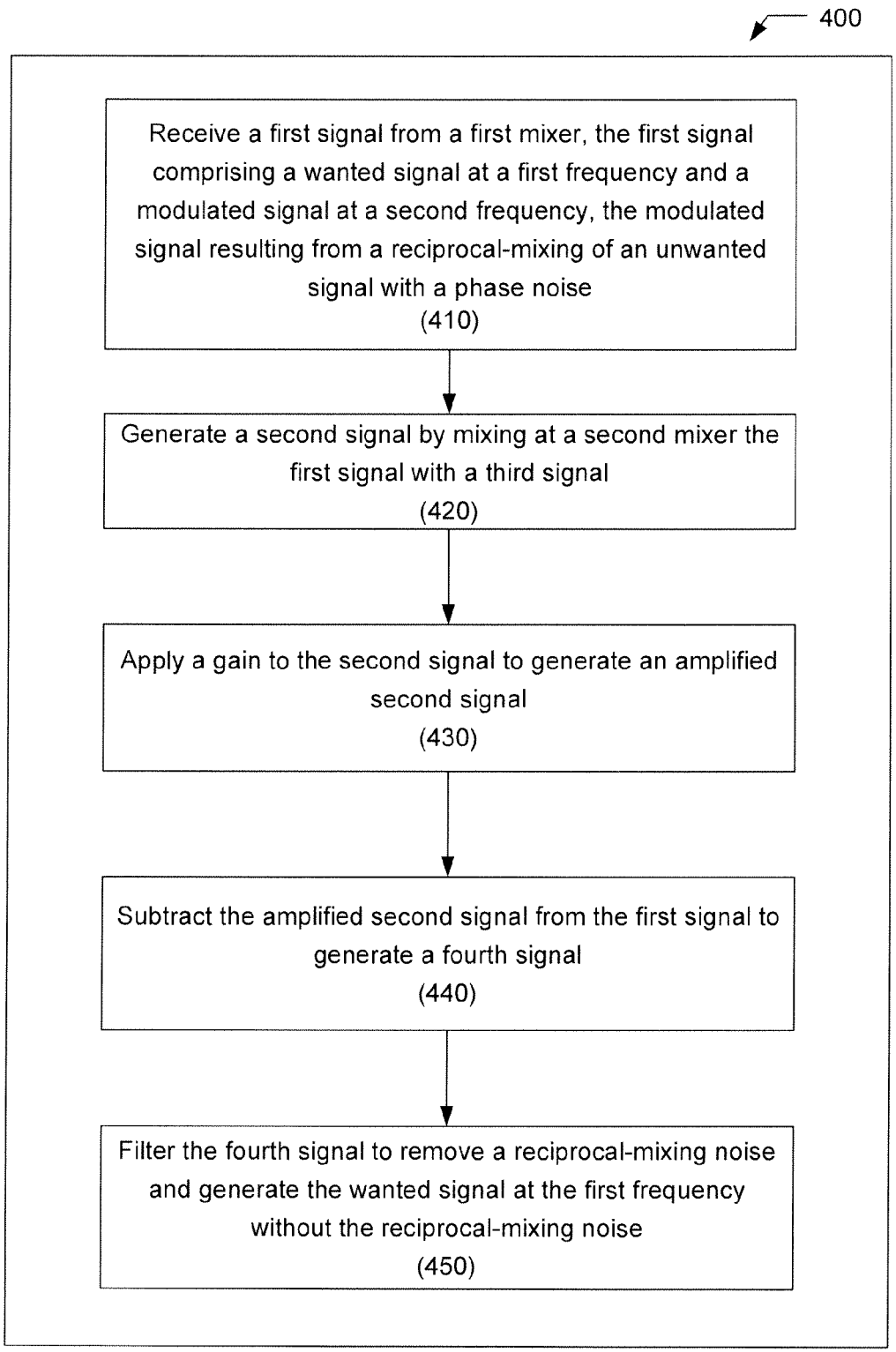
FIG. 4 illustrates a flow diagram of an example method for reciprocal mixing noise cancellation in the presence of a modulated blocker signal in accordance with one or more implementations.

FIG. 4 illustrates a flow diagram of an example method 400 for reciprocal mixing noise cancellation in the presence of a modulated blocker signal in accordance with one or more implementations of the subject technology. The method 400 may start at operation block 410, where a first signal (e.g., 206 of FIG. 2A) may be received from a first mixer (e.g., 210 of FIG. 2A). The first signal may comprise a wanted signal (e.g., 203 of FIG. 2A) at a first frequency and a modulated signal (e.g., 225 of FIG. 2A) at a second frequency (e.g., $\Delta f_b$ of FIG. 2A). The modulated signal may result from a reciprocal-mixing of an unwanted signal (e.g., 205 of FIG. 2A) with a phase noise (e.g., 225 of FIG. 2A). The second frequency may be greater than the first frequency, and at least a portion of the modulated signal may overlap the wanted signal, adding a reciprocal-mixing noise (e.g., 101 of FIG. 1B) to the wanted signal.

At operation block 420, a second signal may be generated by mixing at a second mixer (e.g., 220 of FIG. 2A) the first signal with a third signal (e.g., generated by 230 of FIG. 2A).

The third signal may be a narrow signal at a third frequency (e.g., $2\Delta f_b$ of FIG. 2A) related to blocker offset frequency (e.g., $\Delta f_b$). At operation block 430, a gain may be applied (e.g., using 240 of FIG. 2A) to the second signal and an amplified second signal (e.g., 242 of FIG. 2A) may be generated. The amplified second signal, at operation block 440, may be subtracted (e.g., using 250 of FIG. 2A) from the first signal to generate a fourth signal (e.g., Z of FIG. 2A). At operation block 450, the fourth signal may be filtered (e.g., using 260 of FIG. 2A) to remove a reciprocal-mixing noise and to generate the wanted signal (e.g., 203 of FIG. 2A) at the first frequency without the reciprocal-mixing noise.

Figure 5:
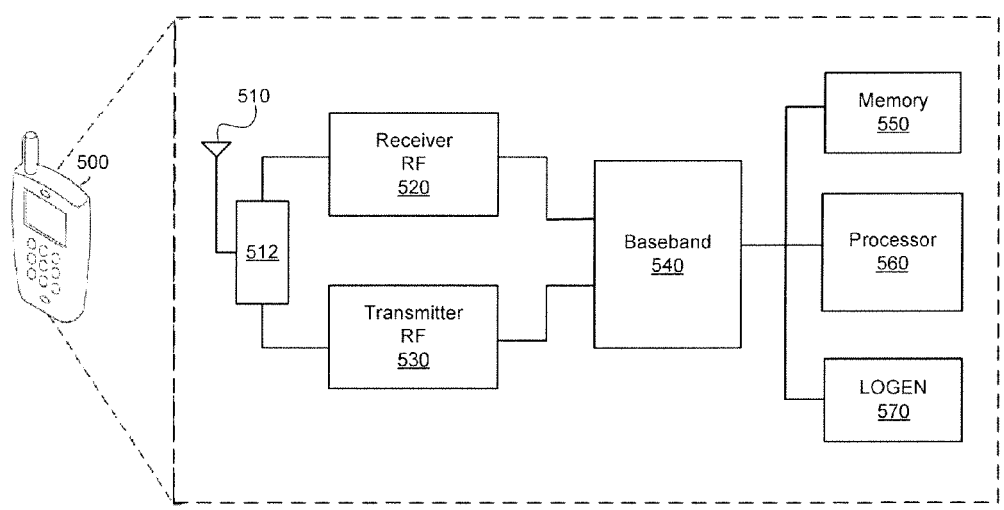
FIG. 5 illustrates an example wireless communication device in accordance with one or more implementations.

FIG. 5 illustrates an example wireless communication device 500 in accordance with one or more implementations of the subject technology. The wireless communication device 500 may comprise a radio-frequency (RF) antenna 510, a receiver 520, a transmitter 530, a baseband processing module 540, a memory 550, a processor 560, and a local oscillator generator (LOGEN) 570. In various embodiments of the subject technology, one or more of the blocks represented in FIG. 5 may be integrated on one or more semiconductor substrates. For example, the blocks 520-570 may be realized in a single chip or a single system on chip, or may be realized in a multi-chip chipset.

The RF antenna 510 may be suitable for transmitting and/or receiving RF signals (e.g., wireless signals) over a wide range of frequencies. Although a single RF antenna 510 is illustrated, the subject technology is not so limited.

The receiver 520 may comprise suitable logic circuitry and/or code that may be operable to receive and process signals from the RF antenna 510. The receiver 520 may, for example, be operable to amplify and/or down-convert received wireless signals. In various embodiments of the subject technology, the receiver 520 may be operable to cancel noise in received signals and may be linear over a wide range of frequencies. In this manner, the receiver 520 may be suitable for receiving signals in accordance with a variety of wireless standards. Wi-Fi, WiMAX, Bluetooth, and various cellular standards. In various embodiments of the subject technology, the receiver 520 may not require any SAW filters and few or no off-chip discrete components such as large capacitors and inductors.

The transmitter 530 may comprise suitable logic circuitry and/or code that may be operable to process and transmit signals from the RF antenna 510. The transmitter 530 may, for example, be operable to up-convert baseband signals to RF signals and amplify RF signals. In various embodiments of the subject technology, the transmitter 530 may be operable to up-convert and amplify baseband signals processed in accordance with a variety of wireless standards. Examples of such standards may include Wi-Fi, WiMAX, Bluetooth, and various cellular standards. In various embodiments of the subject technology, the transmitter 530 may be operable to provide signals for further amplification by one or more power amplifiers.

The duplexer 512 may provide isolation in the transmit band to avoid saturation of the receiver 520 or damaging parts of the receiver 520, and to relax one or more design requirements of the receiver 520. Furthermore, the duplexer 512 may attenuate the noise in the receive band. The duplexer may be operable in multiple frequency bands of various wireless standards.

The baseband processing module 540 may comprise suitable logic, circuitry, interfaces, and/or code that may be operable to perform processing of baseband signals. The baseband processing module 540 may, for example, analyze received signals and generate control and/or feedback signals for configuring various components of the wireless communication device 500 such as the receiver 520. The baseband processing module 540 may be operable to encode, decode, transcode, modulate, demodulate, encrypt, decrypt, scramble, descramble, and/or otherwise process data in accordance with one or more wireless standards.

The processor 560 may comprise suitable logic, circuitry, and/or code that may enable processing data and/or controlling operations of the wireless communication device 500. In this regard, the processor 560 may be enabled to provide control signals to various other portions of the wireless communication device 500. The processor 560 may also control transfers of data between various portions of the wireless communication device 500. Additionally, the processor 560 may enable implementation of an operating system or otherwise execute code to manage operations of the wireless communication device 500 and to perform the method of FIG. 4.

The memory 550 may comprise suitable logic, circuitry, and/or code that may enable storage of various types of information such as received data, generated data, code, and/or configuration information. The memory 550 may comprise, for example, RAM, ROM, flash, and/or magnetic storage. In various embodiment of the subject technology, Information stored in the memory 550 may be utilized for configuring the receiver 520 and/or the baseband processing module 540.

The local oscillator generator (LOG EN) 570 may comprise suitable logic, circuitry, interfaces, and/or code that may be operable to generate one or more oscillating signals of one or more frequencies. The LOGEN 570 may be operable to generate digital and/or analog signals. In this manner, the LOGEN 570 may be operable to generate one or more clock signals and/or sinusoidal signals. Characteristics of the oscillating signals such as the frequency and duty cycle may be determined based on one or more control signals from, for example, the processor 560 and/or the baseband processing module 540.

In operation, the processor 560 may configure the various components of the wireless communication device 500 based on a wireless standard according to which it is desired to receive signals. Wireless signals may be received via the RF antenna 510 and amplified and down-converted by the receiver 520. The baseband processing module 540 may perform noise estimation and/or noise cancellation, decoding, and/or demodulation of the baseband signals. In this manner, information in the received signal may be recovered and utilized appropriately. For example, the information may be audio and/or video to be presented to a user of the wireless communication device, data to be stored to the memory 550, and/or information affecting and/or enabling operation of the wireless communication device 500. The baseband processing module 540 may modulate, encode and perform other processing on audio, video, and/or control signals to be transmitted by the transmitter 530 in accordance to various wireless standards.

Those of skill in the art would appreciate that the various illustrative blocks, modules, elements, components, and methods described herein may be implemented as electronic hardware, computer software, or combinations of both. To illustrate this interchangeability of hardware and software, various illustrative blocks, modules, elements, components, and methods have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method for reciprocal-mixing noise cancellation, the method comprising:

receiving a first signal from a first mixer, the first signal comprising a wanted signal at a first frequency and a modulated signal at a second frequency, the modulated signal resulting from a reciprocal-mixing of an unwanted signal with a phase noise, wherein the second frequency is greater than the first frequency, and at least a portion of the modulated signal overlaps the wanted signal, adding a reciprocal-mixing noise to the wanted signal;

generating a second signal by mixing at a second mixer the first signal with a third signal, the third signal being a narrow signal at a third frequency, wherein the third frequency is related to a blocker offset frequency;

applying a gain to the second signal to generate an amplified second signal;

subtracting the amplified second signal from the first signal to generate a fourth signal; and filtering the fourth signal to remove a reciprocal-mixing noise and generating the wanted signal at the first frequency without the reciprocal-mixing noise.

2. The method of claim 1, wherein the modulated signal results from reciprocal-mixing of the unwanted signal with a symmetrical phase noise frequency spectrum of a local oscillator (LO) of the first mixer, and wherein the first mixer is a down-conversion mixer that down converts a radio frequency (RF) signal in the presence of the unwanted signal.

3. The method of claim 1, wherein the unwanted signal comprises a modulated blocker signal, the first signal comprises a baseband signal, the first frequency is a frequency substantially equal to zero, and the second frequency is a blocker-offset frequency.

4. The method of claim 3, further comprising generating the third signal by using a wideband phase-locked loop (PLL), and wherein the third frequency is twice the blocker-offset frequency, and wherein the blocker-offset frequency comprises an offset of the frequency of the unwanted signal with respect to a frequency of a local oscillator (LO) of the first mixer.

5. The method of claim 4, further comprising filtering the first signal, before mixing the first signal with the third signal, by using a low-pass filter (LPF), wherein a cut-off frequency of the first LPF coincides with the frequency of the LO of the first mixer.

6. The method of claim 1, further comprising filtering the second signal, before applying the gain to the second signal, by using a low-pass filter (LPF).

7. The method of claim 6, wherein a cut-off frequency of the LPF coincides with a frequency of an RF wanted signal received by the first mixer, and wherein the gain is set to be approximately equal to two.

8. The method of claim 1, wherein filtering the fourth signal comprises using a LPF, and wherein a cut-off frequency of the LPF coincides with the first frequency.

9. A system for reciprocal mixing noise cancellation, the system comprising:
a first mixer configured to generate a first signal comprising a wanted signal at a first frequency and a modulated signal at a second frequency, the modulated signal resulting from a reciprocal-mixing of an unwanted signal with a phase noise, wherein the second frequency is greater than the first frequency, and at least a portion of the modulated signal overlaps the wanted signal, adding a reciprocal-mixing noise to the wanted signal;
a second mixer configured to generate a second signal by mixing the first signal with a third signal, the third signal being a narrow signal at a third frequency, wherein the third frequency is related to a blocker offset frequency;
a gain stage configured to amplify the second signal and to generate an amplified second signal;
a subtraction module configured to subtract the amplified second signal from the first signal to generate a fourth signal; and
a filter configured to filter the fourth signal to remove a reciprocal-mixing noise and generate the wanted signal at the first frequency without the reciprocal-mixing noise.

10. The system of claim 9, wherein the modulated signal results is a product of reciprocal-mixing of the unwanted signal with a symmetrical phase noise frequency spectrum of a local oscillator (LO) of the first mixer, and wherein the first mixer is a down-conversion mixer configured to down convert a radio frequency (RF) signal in the presence of the unwanted signal.

11. The system of claim 9, wherein the unwanted signal comprises a modulated blocker signal, the first signal comprises a baseband signal, the first frequency is a frequency substantially equal to zero, and the second frequency is a blocker-offset frequency.

12. The system of claim 11, further comprising a wideband phase-locked loop (PLL) configured to generate the third signal, wherein the third frequency is twice the blocker-offset frequency, and wherein the blocker-offset frequency comprises an offset of the frequency of the unwanted signal with respect to a frequency of a local oscillator (LO) of the first mixer.

13. The system of claim 12, further comprising a low-pass filter (LPF) configured to filter the first signal before mixing the first signal with the third signal, wherein a cut-off frequency of the first LPF coincides with the frequency of the LO of the first mixer.

14. The system of claim 9, further comprising a low-pass filter (LPF) configured to filter the second signal before applying the gain to the second signal.

15. The system of claim 14, wherein a cut-off frequency of the LPF coincides with a frequency of an RF wanted signal received by the first mixer, and wherein the gain is set to be approximately equal to two.

16. The system of claim 9, wherein the filter comprises a low-pass filter (LPF) configured to filter the fourth signal and wherein a cut-off frequency of the LPF coincides with the first frequency.

17. A communication device comprising:
memory to store one or more program modules; and
one or more processors couple to the memory and configured to execute the one or more program modules to:
receive a first signal from a first mixer, the first signal comprising a wanted signal at a first frequency and a modulated signal at a second frequency, the modulated signal resulting from a reciprocal-mixing of an unwanted signal with a phase noise, wherein the second frequency is greater than the first frequency, and at least a portion of the modulated signal overlaps the wanted signal, adding a reciprocal-mixing noise to the wanted signal;
generate a second signal by mixing at a second mixer the first signal with a third signal, the third signal being a narrow signal at a third frequency, wherein the third frequency is related to a blocker offset frequency;
apply a gain to the second signal and generate an amplified second signal;
subtract the amplified second signal from the first signal and generate a fourth signal; and
filter the fourth signal and remove a reciprocal-mixing noise and generate the wanted signal at the first frequency without the reciprocal-mixing noise.

18. The communication device of claim 17, wherein:
the modulated signal results from reciprocal-mixing of the unwanted signal with a symmetrical phase noise frequency spectrum of a local oscillator (LO) of the first mixer,
the first mixer is a down-conversion mixer that down converts a radio frequency (RF) signal in the presence of the unwanted signal,
the unwanted signal comprises a modulated blocker signal,
the first signal comprises a baseband signal,
the first frequency is a frequency substantially equal to zero, and
the second frequency is a blocker-offset frequency.

19. The communication device of claim 18, wherein:
the one or more processors are further configured to execute the one or more program modules to generate the third signal by using a wideband phase-locked loop (PLL),
the third frequency is twice the blocker-offset frequency,
the blocker-offset frequency comprises an offset of the frequency of the unwanted signal with respect to the frequency of the LO of the first mixer.

20. The communication device of claim 17, wherein the one or more processors are further configured to execute the one or more modules to:
filter the first signal, before mixing the first signal with the third signal, by using a first land-pass filter (LPF) having a cut-off frequency coinciding with a frequency of a local oscillator (LO) of the first mixer;
filter the second signal, before applying the gain to the second signal, by using a second LPF having a cut-off frequency coinciding with a frequency of an RF wanted signal received by the first mixer; and
filter the fourth signal by using a third LPF having a cut-off frequency coinciding with the first frequency.

* * * * *